US012808980B2

(12) United States Patent
Kesaraju et al.

(10) Patent No.: US 12,808,980 B2

(45) Date of Patent: Nov. 24, 2026

(54) METHODS AND SYSTEM FOR OBJECT DETECTION IN A RADAR SYSTEM

(71) Applicant: Infineon Technologies AG, Neubiberg (DE)

(72) Inventors: Saiveena Kesaraju, Sunnyvale, CA (US); Jagjit Singh Bal, Mountain House, CA (US)

(73) Assignee: Infineon Technologies AG, Neubiberg (DE)

( * ) Notice: Subject to any disclaimer, the term of this patent is extended or adjusted under 35 U.S.C. 154(b) by 193 days.

(21) Appl. No.: 18/441,447

(22) Filed: Feb. 14, 2024

(65) Prior Publication Data

US 2025/0258276 A1 Aug. 14, 2025

(51) Int. Cl.

*G01S 7/35* (2006.01)

*G01S 13/536* (2006.01)

(52) U.S. Cl.

CPC ............ *G01S 7/354* (2013.01); *G01S 13/536* (2013.01)

(58) Field of Classification Search

None

See application file for complete search history.

(56) References Cited

FOREIGN PATENT DOCUMENTS

WO WO-2025166010 A2 * 8/2025 ............ G01S 7/354

OTHER PUBLICATIONS

Jin, Feng et al., "Automotive Radar Interference Mitigation using Adaptive Noise Canceller", IEEE Transactions on Vehicular Technology, vol. XX, No. XX, Nov. 14, 2019, 8 pages.

Skolnik, Merrill I., "Introduction to Radar Systems Second Edition", International Edition 1981, ISBN-0-07-066572-9, Singapore, Jan. 1, 2006, 590 pages.

* cited by examiner

*Primary Examiner* — Whitney Moore

(74) *Attorney, Agent, or Firm* — Slater Matsil, LLP

(57) ABSTRACT

In accordance with an embodiment, a method of operating a radar system includes: estimating an overall noise level of a received radar signal; determining a first noise threshold based on the estimated overall noise level; generating a radar map having a plurality of bins from the radar signal; determining a first subset of the plurality of bins having amplitudes that exceed the first noise threshold; determining a constant false alarm rate (CFAR) threshold only for each bin of the first subset of the plurality of bins; and determining that bins of the first subset having amplitudes exceeding the CFAR threshold correspond to one or more detected object.

20 Claims, 7 Drawing Sheets

METHODS AND SYSTEM FOR OBJECT DETECTION IN A RADAR SYSTEM

TECHNICAL FIELD

The present invention relates generally to a system and method for an electronic system, and, in particular embodiments, to a system and method for determining a constant false alarm rate (CFAR) in a radar system.

BACKGROUND

Radar systems are widely used for detecting and tracking objects by transmitting radio waves and analyzing the reflected signals. Applications in the millimeter-wave frequency regime have gained significant interest in the past few years due to the rapid advancement in low-cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems, gesture recognition system, surveillance systems, and multi-gigabit communication systems.

There has also been an increasing demand for lower power radar systems. This is driven by a variety of factors, including the proliferation of battery-powered devices, the growing emphasis on energy efficiency, and the rise of remote sensing applications where power resources are limited. Lower power radar systems can offer several advantages, such as longer battery life, reduced heat generation, and the ability to operate in energy-constrained environments. However, achieving lower power consumption without compromising detection performance is a challenging task that requires innovative solutions and advancements in radar signal processing techniques.

SUMMARY

In accordance with an embodiment, a method of operating a radar system includes: estimating an overall noise level of a received radar signal; determining a first noise threshold based on the estimated overall noise level; generating a radar map having a plurality of bins from the radar signal; determining a first subset of the plurality of bins having amplitudes that exceed the first noise threshold; determining a constant false alarm rate (CFAR) threshold only for each bin of the first subset of the plurality of bins; and determining that bins of the first subset having amplitudes exceeding the CFAR threshold correspond to one or more detected object.

In accordance with another embodiment, a method of operating a millimeter-wave radar system includes: during a reference setting mode: receiving a first radar signal from a millimeter-wave radar sensor when no moving target is present within a detection range of the millimeter-wave radar system, estimating an overall noise level of the received first radar signal, and determining a first noise threshold based on the estimated overall noise level; and during a detection mode different from the reference setting mode: receiving a second radar signal from the millimeter-wave radar sensor, generating a range-Doppler radar map from the received second radar signal, comparing amplitudes of bins of the range-Doppler radar map to the first noise threshold to produce a first subset of bins having amplitudes exceeding the first noise threshold, where a second subset of bins different from the first subset have amplitudes that do not exceed the first noise threshold, applying a constant false alarm rate (CFAR) detection algorithm to the first subset of bins and not to the second subset of bins, and detecting targets based on the applied CFAR detection algorithm.

In accordance with a further embodiment, a system includes: a millimeter-wave radar sensor; and a processor coupled to the millimeter-wave radar sensor. The processor is configured to: during a reference setting mode, estimate an overall noise level of a first radar signal received from the millimeter-wave radar sensor, and determine a first noise threshold based on the estimated overall noise level, and during a detection mode different from the reference setting mode, generate a range-Doppler radar map from a second radar signal received form the millimeter-wave radar sensor, determine a first subset of bins having amplitudes exceeding the first noise threshold, where a second subset of bins different from the first subset have amplitudes that do not exceed the first noise threshold, apply a constant false alarm rate (CFAR) detection algorithm to the first subset of bins and not to the second subset of bins, and detect targets based on the applied CFAR detection algorithm.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One signal detection technique used in radar systems is the Constant False Alarm Rate (CFAR) algorithm. CFAR is an adaptive threshold-based signal detection technique that is used to detect targets with enough signal strength above a determined noise threshold. The CFAR technique is particularly useful in environments where the noise level varies, as it adjusts the detection threshold based on the surrounding noise level to maintain a constant false alarm rate.

However, the CFAR technique can be computationally intensive, especially as the size of the input signal increases, as the CFAR technique typically involves processing a large number of cells or bins in a radar map, each of which represents a potential target. This can lead to increased compute time and power consumption, which can be a concern in applications where power efficiency and quick processing are paramount, such as in battery-operated devices.

In an embodiment of the present invention, CFAR detection is performed by comparing bins of a radar map with a noise threshold based on an overall noise level of a received radar signal, and then determining a CFAR threshold only on the bins that exceed the noise threshold. This advantageously reduces the number of radar map bins on which CFAR is implemented, which may reduce the computation load and power consumption of the radar system. In various embodiments, the noise threshold is estimated from frame data collected from radar sensor when no target is present.

Figure 1:
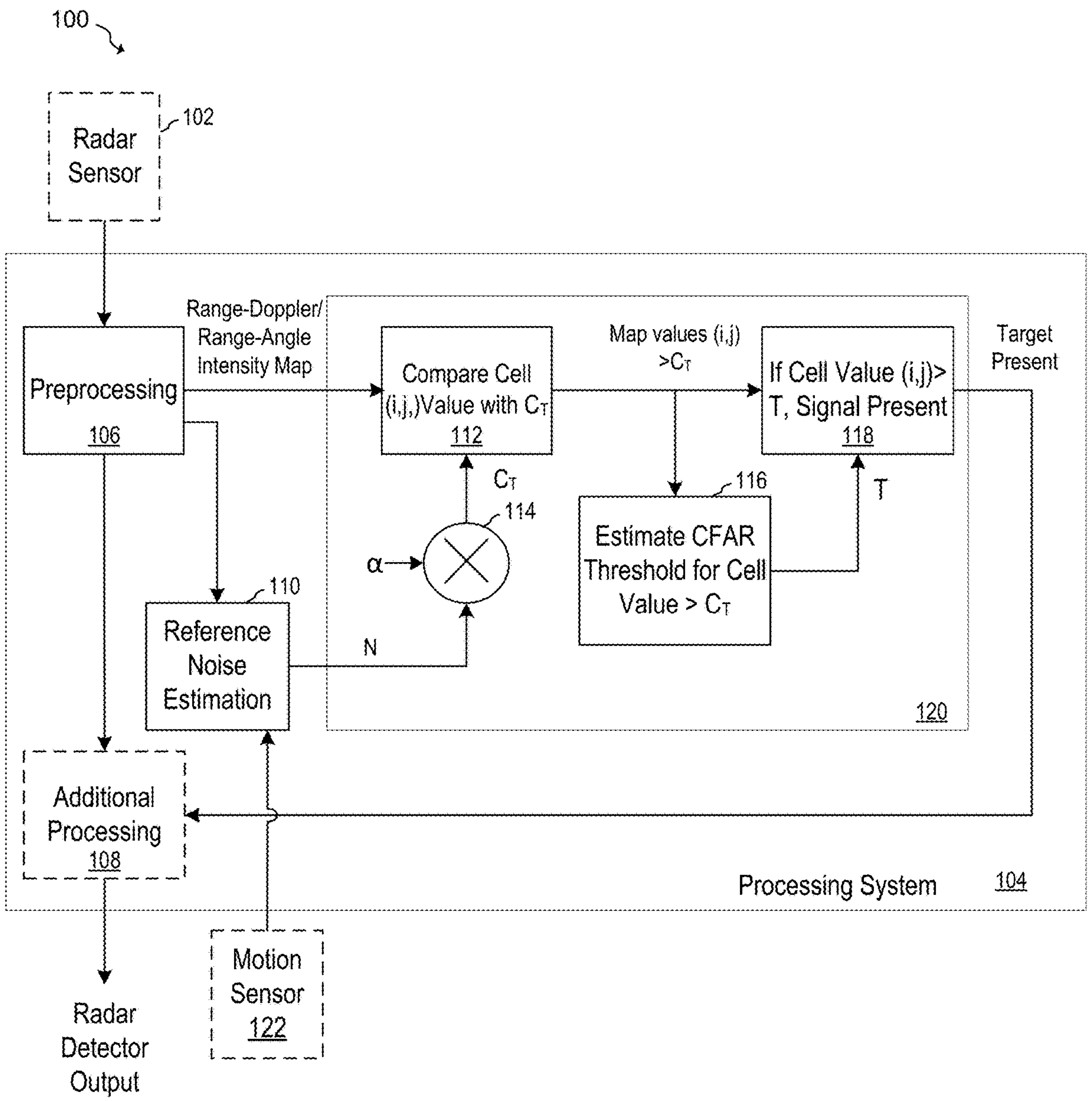
FIG. 1 illustrates a radar system according to an embodiment.

FIG. 1 illustrates radar system 100 that includes radar sensor 102 coupled to processing system 104. In various embodiments, radar sensor 102 is configured to emit radar signals and receive the signals that are reflected back from a detected object. The time taken for the signal to return and the change in frequency of the returned signal provide information about the object's distance and speed. This data is used to generate raw radar data which is then processed to produce a radar map, such as a range-Doppler or a range-angle intensity map. This map is subsequently used to determine the presence of targets.

The radar sensor can be implemented using various radar techniques and technologies. For example, radar sensor 102 may be implemented using a frequency modulated continuous wave (FMCW) millimeter wave radar sensor described in further detail below. Alternatively, radar sensor 102 could also be implemented using pulse radar techniques. Pulse radar operates by emitting short, powerful pulses of radio waves and then listening for the echoes of these pulses. The time delay between the emission of a pulse and the receipt of an echo provides information about the distance to the object, while the frequency shift of the echo provides information about the object's velocity.

Processing system 104 is responsible for processing the raw radar signals received from radar sensor 102, and is configured to perform a series of operations to transform the raw radar data into a form that can be used for target detection. As shown, processing system 104 includes a preprocessing block 106 that performs various RF signal processing tasks to produce a radar map, such as a range-Doppler or a range-angle intensity map. In some embodiments, the radar map can be a range-Doppler radar map or a portion of a range angle map of a range-Doppler map representing a range angle within the range-Doppler map. The method of generating the radar map from the radar signal could be varied. Instead of producing a range-Doppler map, other types of radar maps, such as range-angle or Doppler-angle maps, could be used. Processing system 104 may be located and/or integrated with radar sensor 102, may be implemented external to radar sensor 102, or may be implemented both internal and external to radar sensor 102. In some embodiments processing system may be a distributed system external to radar sensor 102. Such a distributed system may include or more processors and one or more memories.

According to some embodiments target presence detector 120 includes map intensity comparison block 112, multiplier 114, CFAR threshold estimation block 116, and threshold comparison block 118.

Map intensity comparison block 112 compares the intensity of each bin in the radar map to the noise threshold established by multiplier 114. The radar map, for example, may be a range-Doppler map having bins representing radar signal intensity according range and Doppler values, or may be a range-angle map having bins representing radar signal intensity according to range and angle. The threshold $C_T$ established by multiplier 114 can be considered as a noise threshold or a coarse threshold that is used by map intensity comparison block 112 to determine whether the signal strength of a particular bin is above a predetermined level $\alpha$ above a reference noise level N. Hence, map intensity comparison block 112 serves to prequalify (i.e. select) particular bins of the radar map having a sufficient signal strength prior to performing CFAR threshold estimation by CFAR threshold estimation block 116.

As shown, noise threshold $C_T$ is determined by multiplying an estimated noise level N of the radar sensor by a constant or offset $\alpha$. In some embodiments, the predetermined offset $\alpha$ may represent a value between 5 dB and 10 dB. Alternatively, values outside of this range may be used depending on the particular embodiment its implementation.

CFAR threshold estimation block 116 is configured to determine the CFAR threshold for the bins of the radar map that exceed the noise threshold $C_T$. The CFAR threshold may be an adaptive threshold that is estimated based on the statistics of the surrounding bins. This is accomplished using adaptive algorithms that can be implemented by processing system 104. The CFAR threshold estimation block 116 provides a more refined threshold for target detection, taking into account the variability of the noise in the radar data.

In one embodiment, CFAR threshold estimation block 116 is configured establish the CFAR threshold T by determining a mean amplitude of a defined set of neighboring bins around each bin of a first subset of radar map bins that exceed the noise threshold $C_T$. CFAR threshold estimation block 116 may also implement CFAR threshold determination techniques known in the art, such as greatest of CFAR (GO-CFAR), smallest of CFAR (SO-CFAR), or ordered statistic CFAR (OS-CFAR) depending on the specific requirements of the radar system 100. These variations of the CFAR algorithm may offer different trade-offs in terms of detection performance, computational complexity, and robustness to different noise and clutter conditions. For instance, the GO-CFAR algorithm may provide robust performance in the presence of multiple targets or clutter edges, while the SO-CFAR algorithm may be more suitable for environments with homogeneous background noise. The OS-CFAR algorithm, on the other hand, may offer a balance between performance and complexity. In many embodiments, the determination of CFAR threshold T for each bin involves multiple calculations on neighboring cells. Thus, it can be seen that limiting the determination of the CFAR threshold to bins that exceed noise threshold $C_T$ has the potential to advantageously reduce the total number of calculations performed while performing target detection, thereby saving power.

Threshold comparison block 118 is configured to compare the bins of the range-Doppler map or the range-angle map to the CFAR threshold T to determine whether the particular bin represents the presence of a target. In some embodiments, this comparison is performed on radar map values that have been determined by map intensity comparison block to exceed noise threshold $C_T$.

Reference noise estimation block 110 determines a reference noise level N of radar sensor 102, for example, by averaging noise values produced by radar sensor 102. In some embodiments, the reference noise level is determined when no target is present as explained further herein. In some embodiments, the determination as to whether or not a target is present may be determined by motion sensor 122, which can be an optical, acoustic, and/or an inertial sensor.

In some embodiments, additional processing 108 may optionally be performed on one or more outputs of preprocessing block 106 and the per-bin target presence indication generated by threshold comparison block 118 to produce a radar detector output. Additional processing 108 may include but is not limited to processing that performs target tracking and/or identification. In some embodiments, additional processing block 108 may be configured to identify targets using methods and algorithms known in the art. These algorithms may include, but are not limited to machine learning algorithms for gesture recognition, facial recognition, presence detection, and vital sensing.

In various embodiments, processing system 104 may be implemented using a hardware-based and/or software-based components. The hardware components could include one or more application-specific Integrated Circuits (ASICs), field-programmable gate arrays (FPGAs), and/or digital signal processors (DSPs) configured to efficiently perform high-speed signal processing tasks. In some embodiments, one or more portions of processing system 104 may be implemented using a general-purpose processor. In some embodiments, one or more memories may be resident within processing system 104 that store program code configured to be executed by the general-purpose processor or other programmable components, such as the DSP, to perform the operations described herein.

Figure 2:
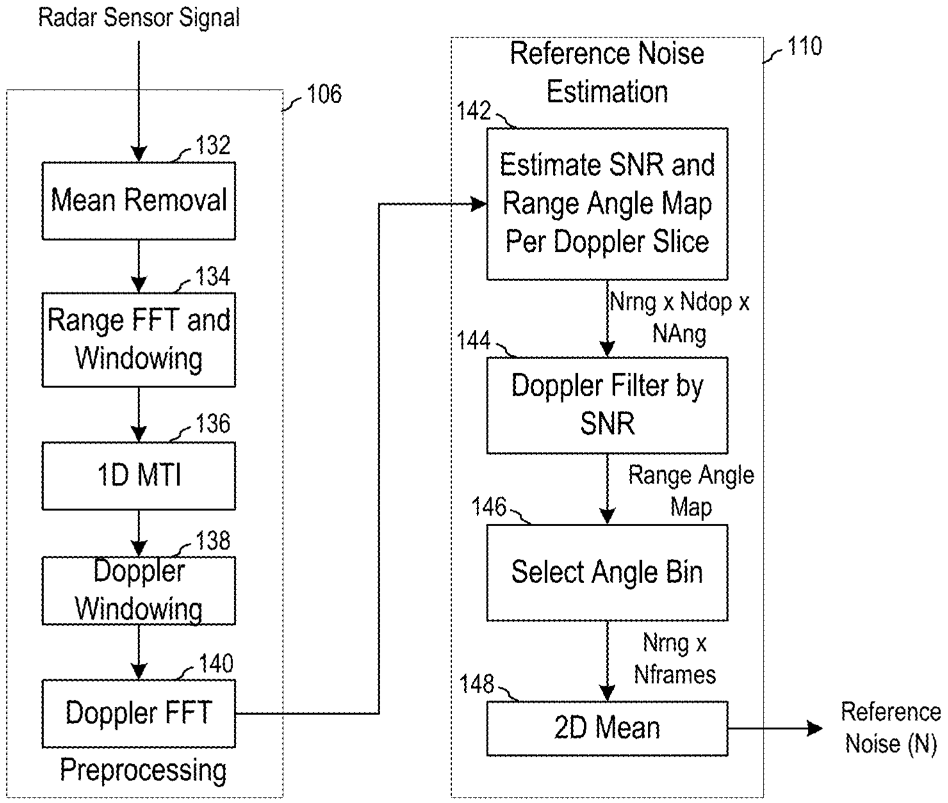
FIG. 2 is a block diagram detailing an example of radar processing blocks of the embodiment of FIG. 1.

FIG. 2 illustrates a detailed example of preprocessing block 106 and reference noise estimation block 110. The preprocessing block 106 performs various RF signal processing tasks to prepare the radar signals for further analysis. These tasks include removing the mean value from the radar sensor signal, performing a Fast Fourier Transform (FFT) to convert the signal to the frequency domain, and applying windowing functions to minimize spectral leakage. The specific methods and algorithms used in the preprocessing block 106 can vary based on the desired performance characteristics, computational resources, and the specific application of the radar system 100.

The preprocessing block 106 includes a mean removal block 132 that removes the mean from the radar sensor signal produced by radar sensor 102. This block may be used to center the signal around zero, which can improve the subsequent processing steps. Mean removal block may be configured to, for example, determine an average value of the radar signal and subtract the determined average value of the signal over a period of time from each signal sample. In some cases, other types of signal conditioning methods, such as normalization, filtering, or decimation, could be used instead of or in addition to mean removal.

The preprocessing block 106 also includes a range FFT and windowing block 134 that performs a range FFT and windowing of the output of mean removal block 132. This block converts the time-domain signal into the frequency domain, to produce an array indicative of detected objects with respect to range (e.g., distance from the radar sensor). The windowing function may be applied before the FFT to minimize spectral leakage. Implementation could include using digital signal processing (DSP) techniques and algorithms for FFT computation and apply a window function like a Hamming, a Hanning, or Blackman window to the signal.

A 1-dimensional (1D) moving target indicator (MTI) block 136 in the preprocessing block 106 performs an MTI of the output range FFT and windowing block 134. Performing MTI filtering serves to discriminate a target against clutter (e.g., only targets with, e.g., high motion are retained as their energy varies across Doppler images). Thus, after MTI filtering, a target may be identifiable while information about the background may be partially or fully removed. This block filters out static or slow-moving objects from the signal, which helps in emphasizing moving targets. 1-D MTI block 136 may be implemented, for example, MTI techniques and algorithms known in the art. In alternative embodiments, 1-D MTI block 136 may be implemented in two-dimensions.

A Doppler windowing block 138 performs a Doppler windowing of the output of 1D MTI block 136 to reduce spectral leakage before performing a Doppler FFT. A Doppler FFT block 140 produces a range-Doppler map based on the output of Doppler windowing block 138. The range-Doppler map is a two-dimensional representation of target range and velocity.

The reference noise estimation block 110 determines the reference noise level N of the radar sensor 102 for use in setting noise threshold $C_T$. This block estimates the noise level in the radar signals by performing a statistical analysis of the signal when no targets are present to determine a baseline noise level. The reference noise estimation block 110 includes a range-angle map and SNR estimation block 142 that produces a range-angle map along with an estimation of an SNR per Doppler slice. In some embodiments, an angle is estimated by digital beamforming techniques based on the range-Doppler map as known in the art. The output of range-angle map and SNR estimation block 142 is a three-dimensional array with dimensions of Nrng×Ndop×Nang, where Nrng represents a number of range bins in a first dimension, Ndop represents a number of Doppler bins in a second dimension, and Nang represents a number of angle bins in a third dimension. In some embodiments, respective SNRs are estimated for each Doppler slice in the second dimension. For example, the signal power may be estimated by finding the maximum value for each two-dimensional (Nrng×Nang) range-angle slice corresponding to a particular Doppler bin, and the noise value may be estimated by computing the variance of the bins of the range-angle slice. From here, the SNR is calculated by dividing the estimated signal power by the estimated noise value. It should be understood that this method of estimating the SNR is just one example of a number of possible ways of performing this determination. Alternatively, other known SNR estimation could be used.

A Doppler filter by SNR block 144 in the reference noise estimation block 110 selects the top Doppler indices with maximum power to produce a range-angle map. One of the angle bins is selected by an angle bin selection block 146 and data is collected over a number of frames Nframes. In one embodiment, the zero degree range angle bin is selected for use in the noise determination. However, in alternative embodiments, other angle bins could be used. A two-dimensional (2D) mean is taken on the output of angle bin selection block 146 to produce an estimate of reference noise level N. In some cases, instead of determining the average power of all bins, other statistical measures such as the median, mode, or other statistical measures could be used to estimate the noise level.

It should be appreciated that the implementation of reference noise estimation block 110 is just one of many possible example implementations. In alterative embodiments, reference noise N could be determined using different and/or modified processing steps. For example, in some embodiments, step 2D mean step 148 could be implemented by taking a one-dimensional or a three or more dimensional mean of different types of radar data. For example, a three-dimensional mean of all angle bins over multiple frames could be determined. In some embodiments, the mean-squared power of the radar sensor signal, the mean of the output of range FFT and windowing block, the mean of the output of Doppler FFT block 140, or other mean calculation could be used to determined reference noise (N).

Figure 3:
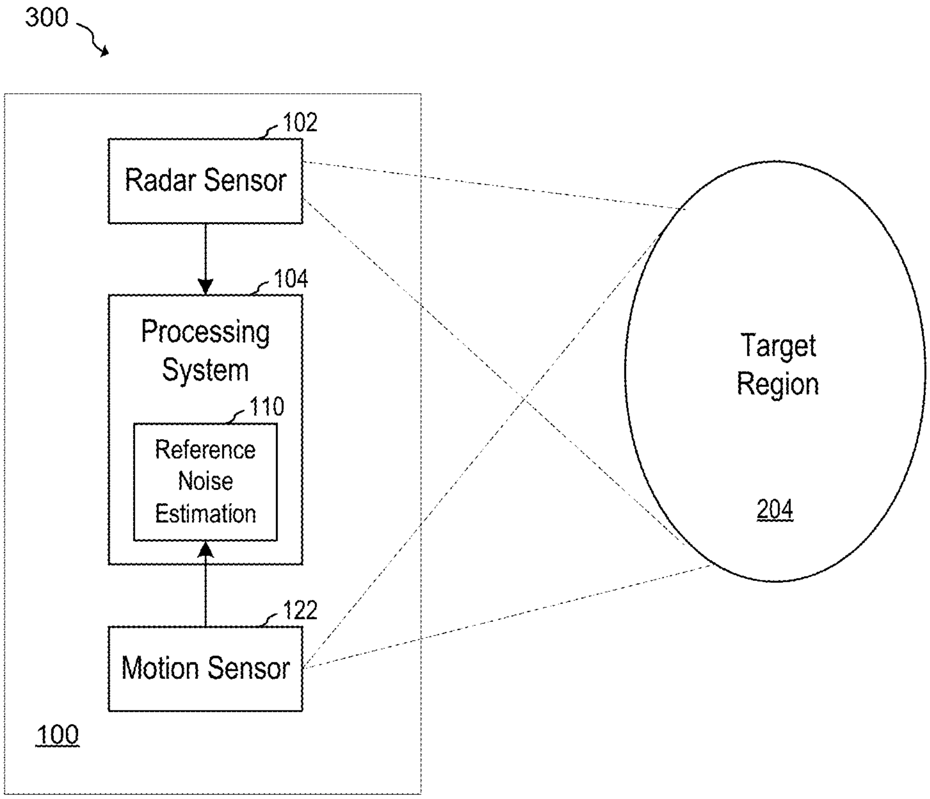
FIG. 3 illustrates an embodiment radar application scenario.

FIG. 3 illustrates a block diagram of an application scenario 300 for radar system 100 in the context of monitoring target region 204. As shown, radar system 100 includes radar sensor 102, processing system 104 and motion sensor 122 discussed above. In embodiments, motion sensor 122 monitors target region 204 to determine when a target region does not include a moving target. Target region 204 may denote the area or space within which the radar system is designed to detect objects. This could be a specific volume of air, a section of ground, or any other defined spatial region where the radar sensor's emitted signals are directed and from which reflected signals are expected to be received. In various embodiments, monitoring the target region 204 may involve positioning the radar sensor appropriately, calibrating its range and sensitivity, and using the processing system to analyze the received signals to identify and locate targets within this region.

In some embodiments, reference noise reference estimation block 110 within processing block 104, as described above with respect to FIGS. 1 and 2, is triggered to perform a reference noise measurement in response to motion sensor 122 detecting that no target is present in target region 204. In some embodiments. Motion sensor 122 may be configured to sense motion on a periodic basis and/or at predetermined time periods. The output of Motion sensor 122 may also be used to determine when radar system 102 is operated in a low power mode. For example, radar sensor 102 may operate at a low frame rate when motion sensor 122 does not detect motion, and may operate at a higher frame rate in response to motion sensor 122 sensing motion. In some cases, motion sensor 122 can be an optical, acoustic, and/or an inertial sensor. The specific type of motion sensor 122 used can vary based on the desired performance characteristics, computational resources, and the specific application of the radar system 100.

Figure 4A:
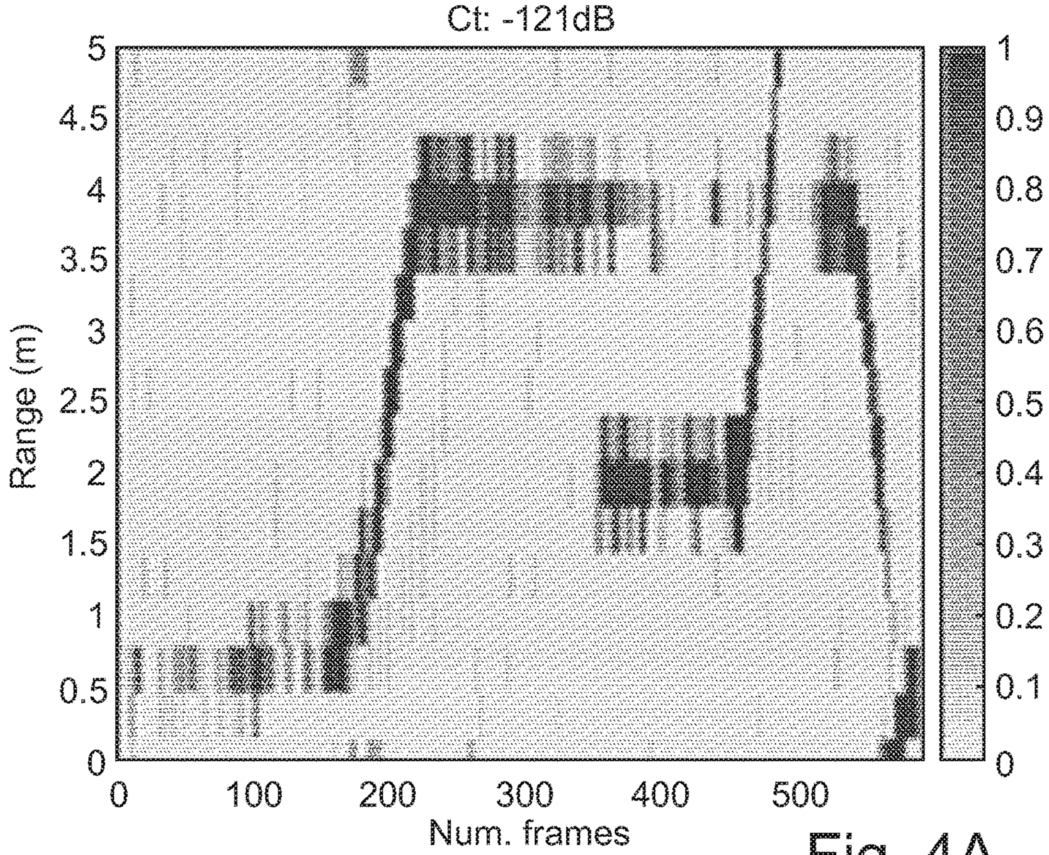
FIGS. 4A and 4B show graphs illustrating the technical performance of embodiment CFAR algorithms.
Figure 4B:
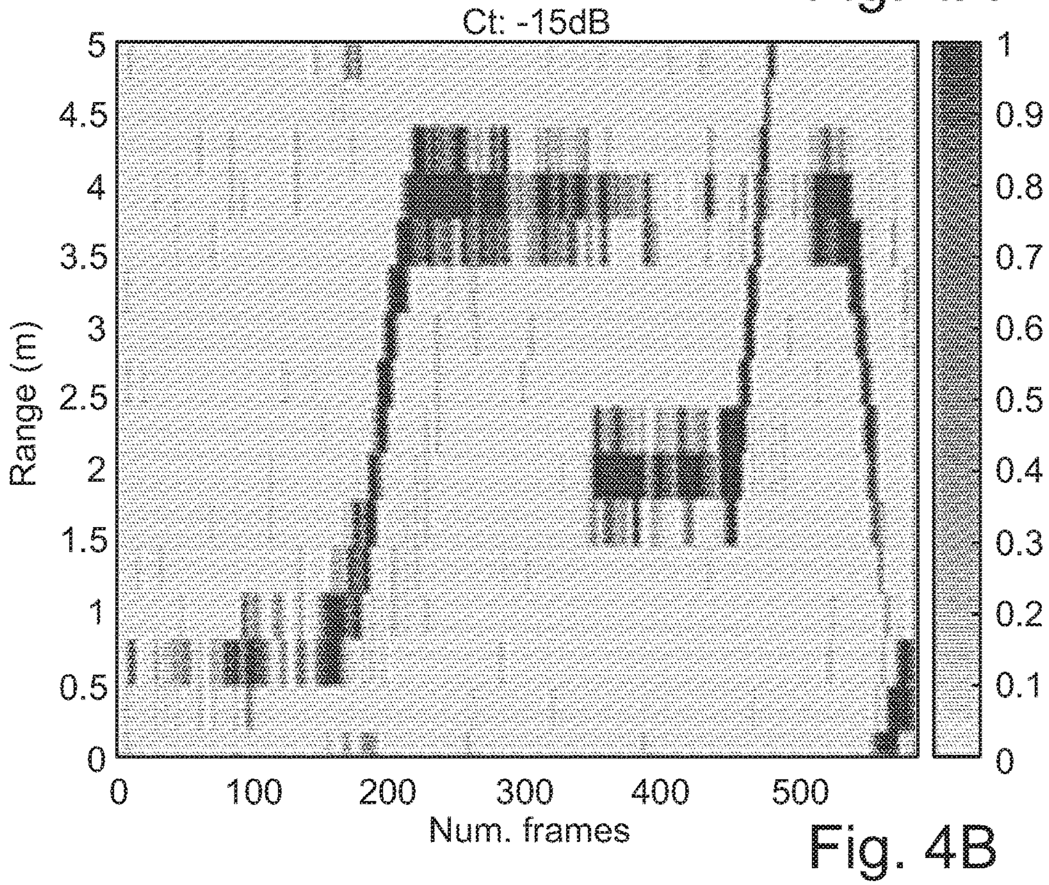

FIGS. 4A and 4B show detection maps that illustrate the performance of embodiment enhanced CFAR techniques compared to conventional CFAR techniques. Each detection maps represents the detected output of a scenario in which a single person is standing at a distance of 4 meters in front of a wall within the radar sensor's target range. In the initial few frames, no one else is present in the scene. Then, a second person walks into the field of view and subsequently leaves. This scenario further assumes a 41×64 2D radar map for a total number of 2624 input cells.

The horizontal axis of each detection map of FIGS. 4A and 4B represents the number of frames, indicating the sequence of radar frames over time. The vertical axis represents the range in meters, showing the distance at which the object is detected from the radar sensor. Lighter shades of the detection map represent higher levels of detection intensity, while darker shades represent lower intensity levels.

The detection map of FIG. 4A was generated using a noise threshold $C_T$ of −121 dB. This assumes a noise floor of −21 dB, and a $\alpha$=−100 dB. Accordingly, noise threshold $C_T$ is well below the noise floor of radar sensor 102, which effectively allows for all radar map values to be evaluated by CFAR threshold estimation block 116. As such, the detection map is representative of the output of conventional CFAR processing.

The detection map of FIG. 4B, on the other hand, was generated using a noise threshold $C_T$ of −15 dB assuming a noise floor of −21 dB, and a $\alpha$=6 dB, which is 6 dB above the noise floor of radar sensor 102. This allows only a subset of radar map values exceeding the threshold of $C_T$ of −15 dB to be processed by the CFAR algorithm. Accordingly, fewer calculations were performed to produce the detection map of FIG. 4B compared to FIG. 4A. However, the detection maps of FIGS. 4A and 4B qualitatively look the same, which indicates that embodiment CFAR techniques can provide similar performance using fewer calculations in some embodiments.

A numerical comparison of the two scenarios represented by FIGS. 4A and 4B are presented in Table 1. The detection rate was calculated as the percentage of true positive frames to the total number of frames. As can be seen, the detection rate of using an embodiment CFAR detection technique with $C_T$=−15 dB is 70.97%, which is very close to the detection rate of 71.9% using conventional CFAR techniques. On the other hand, in this example, embodiment CFAR techniques only involved processing a total number of 251 selected cells for a processing time of 41.5 ms compared to processing all 2624 input cells for a total processing time of 140 ms. The reduced processing time also resulted in a corresponding reduction in power. In the example, provided, the detection rate and calculation examples were determined over frames 216 to 533 when a detected signal was present. Thus, it can be seen that embodiment CFAR techniques potentially provide similar accuracy as conventional CFAR, but with fewer calculations and lower processing power.

TABLE 1

| Coarse Threshold (CT) Reference noise power value (N) is −21 dB for two-person dataset. | Detection rate | Average compute time to process algorithm. | Avg. number of selected cells processed per frame as an input to CFAR detector. |
|---|---|---|---|
| −15 dB ($\alpha$ = 6 dB) | 70.97% | 41.5 msec | 251 |
| −121 dB ($\alpha$ = −100 dB) | 71.9% | 140 msec | 2624 (all input cells) |

It should be understood that the example of FIGS. 4A and 4B is just one of many possible examples taken under a specific set of conditions and assumptions. The result of other performance comparisons may be different depending on the particular system implementation and test conditions.

Figure 5A:
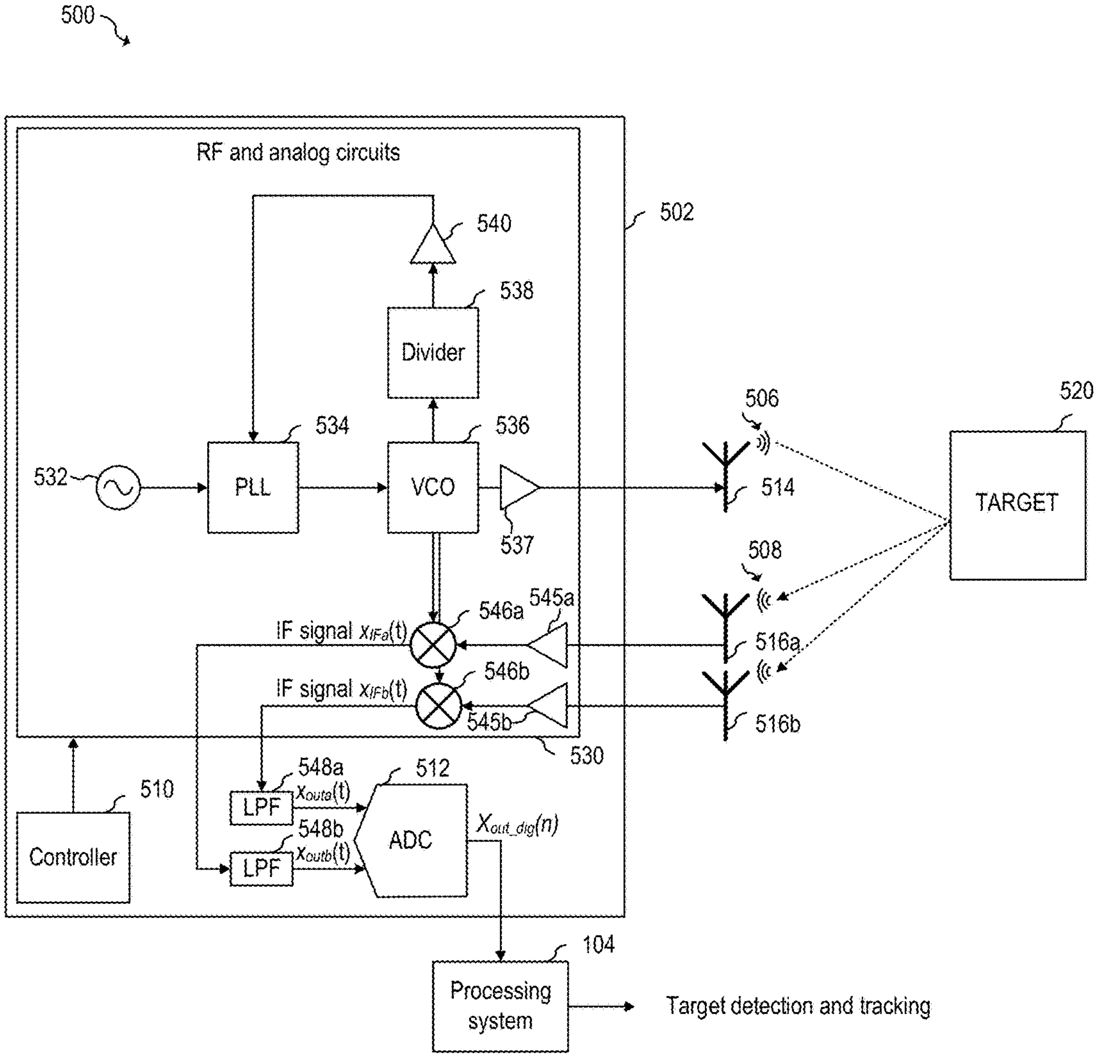
FIG. 5A illustrates an example implementation of an embodiment radar system.

FIG. 5A shows a schematic diagram of millimeter-wave radar system 500, according to an embodiment of the present invention that shows an example implementation of a millimeter-wave frequency-modulated continuous-wave (FMCW) radar system 502 that could be used to implement radar sensor 102. Millimeter-wave radar sensor 502 is shown coupled to embodiment processing system 104.

Millimeter-wave radar sensor 502 may operate as a frequency-modulated continuous-wave (FMCW) radar sensor that transmits a plurality of TX radar signals 506, such as chirps, towards scene 520 using one or more transmitter (TX) antenna 514. The radar signals 506 are generated using RF and analog circuits 530. The radar signals 506 may be, e.g., in the 20 GHz to 522 GHz range. Other frequencies may also be used. The objects in scene 520 may include one or more static or moving objects, such as a surface (e.g., table, countertop, etc.), a keyboard, a wall, and a portion of a human, such as a hand, head, or finger. Other objects may also be present in scene 520.

The radar signals 506 are reflected by objects in scene 520. The reflected radar signals 508, which are also referred to as the echo signal, are received by a plurality of receive (RX) antennas. RF and analog circuits 530 process the received reflected radar signals 508 using, e.g., band-pass filters (BPFs), low-pass filters (LPFs), mixers, low-noise amplifier (LNA), and/or intermediate frequency (IF) amplifiers in ways known in the art to generate an analog signal $x_{outa}(t)$ and $x_{outb}(t)$.

The analog signal $x_{outa}(t)$ and $x_{outb}(t)$ are converted to raw digital data $x_{out\_dig}(n)$ using analog-to-digital converter (ADC) 512. The raw digital data $x_{out\_dig}(n)$ is processed by processing system 104 to detect one or more targets and their position. In some embodiments, processing system 104 may also be used to track one or more targets in scene 520.

Although FIG. 5A illustrates a radar system with two receiver antennas 516 (antennas 516*a* and 516*b*), it is understood that more than two receiver antennas 516, such as three or more, may also be used. In some embodiments, using more receiver antennas 516 may result in higher spatial resolution. Although FIG. 5A illustrates a radar system with a single transmitter antenna 514, it is understood that more than one transmit antenna 514, such as two or more, may also be used. Moreover, even though FIG. 5A shows ADC 512 as being partitioned within radar sensor 502, ADC 512 may be implemented within processing system 104 in some embodiments.

Controller 510 controls one or more circuits of millimeter-wave radar sensor 502, such as RF and analog circuit 530 and/or ADC 512. Controller 510 may be implemented, e.g., as a custom digital or mixed signal circuit, for example. Controller 510 may also be implemented in other ways, such as using a general-purpose processor or controller, for example. In some embodiments, processing system 104 implements a portion or all of controller 510.

Processing system 104 may be implemented with a general-purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general-purpose microcontroller. Other implementations are also possible.

In some embodiments, millimeter-wave radar sensor 502 and a portion or all of processing system 104 may be implemented inside the same integrated circuit (IC). For example, in some embodiments, millimeter-wave radar sensor 502 and a portion or all of processing system 104 may be implemented in respective semiconductor substrates that are integrated in the same package. In other embodiments, millimeter-wave radar sensor 502 and a portion or all of processing system 104 may be implemented in the same monolithic semiconductor substrate. In some embodiments, millimeter-wave radar sensor 502 and processing system 104 are implemented in respective integrated circuits. In some embodiments, a plurality of integrated circuits is used to implement millimeter-wave radar sensor 502. In some embodiments, a plurality of integrated circuits is used to implement processing system 104. Other implementations are also possible.

As a non-limiting example, RF and analog circuits 530 may be implemented, e.g., as shown in FIG. 5A. During normal operation, voltage-controlled oscillator (VCO) 536 generates radar signals, such as a linear frequency chirps (e.g., from 57 GHz to 64 GHz, or from 76 GHz to 77 GHz), which are transmitted by transmit antenna 514. Alternatively, VCO 536 may be configured to generate RF pulses according to pulse radar techniques. The VCO 536 is controlled by PLL 534, which receives a reference clock signal (e.g., 80 MHz) from reference oscillator 532. PLL 534 is controlled by a loop that includes frequency divider 538 and amplifier 540. Amplifier 537 may be used to drive transmit antenna 514.

The TX radar signals 506 transmitted by transmit antenna 514 are reflected by objects in scene 520 and received by receive antennas 516*a* and 516*b*. The echo received by receive antennas 516*a* and 516*b* are mixed with a replica of the signal transmitted by transmit antenna 514 using mixer 546*a* and 546*b*, respectively, to produce respective intermediate frequency (IF) signals $x_{IFa}(t)$ $x_{IFb}(t)$ (also known as beat signals). In some embodiments, the beat signals $x_{IFa}(t)$ and $x_{IFb}(t)$ have a bandwidth between 50 kHz and 5 MHz. Beat signals with a bandwidth lower than 50 kHz or higher than 5 MHz is also possible. Amplifiers 545*a* and 545*b* may be used to receive the reflected radar signals from antennas 516*a* and 516*b*, respectively.

Beat signals $x_{IFa}(t)$ and $x_{IFb}(t)$ are filtered with respective low-pass filters (LPFs) 548*a* and 548*b* and then sampled by ADC 512. ADC 512 is advantageously capable of sampling the filtered beat signals $x_{outa}(t)$ and $x_{outb}(t)$ with a sampling frequency that is much smaller than the frequency of the signal received by receive antennas 516*a* and 516*b*. Using FMCW radars, therefore, advantageously allows for a compact and low-cost implementation of ADC 512, in some embodiments.

The raw digital data $x_{out\_dig}(n)$, which in some embodiments include the digitized version of the filtered beat signals $x_{outa}(t)$ and $x_{outb}(t)$, is (e.g., temporarily) stored, e.g., in matrices of $N_c \times N_s$ per receive antenna 516, where $N_c$ is the number of chirps considered in a frame and $N_s$ is the number of transmit samples per chirp, for further processing by processing system 104.

Figure 5B:
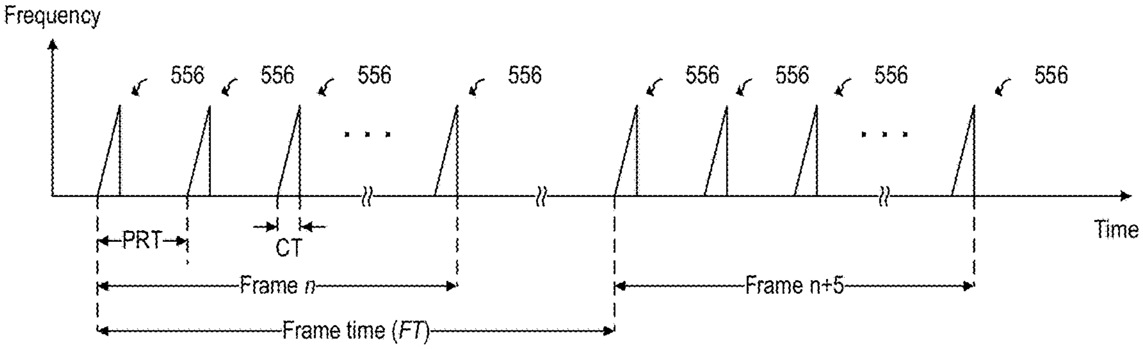
FIG. 5B illustrates a chirp sequence according to an embodiment.

FIG. 5B shows a sequence of chirps 556 transmitted by TX antenna 514, according to an embodiment of the present invention. As shown by FIG. 5B, chirps 556 are organized in a plurality of frames (also referred to as physical frames) and may be implemented as up-chirps. Some embodiments may use down-chirps or a combination of up-chirps and down-chirps, such as up-down chirps and down-up chirps. Other waveform shapes may also be used.

As shown in FIG. 5B, each frame may include a plurality of chirps 556 (also referred to, generally, as pulses). For example, in some embodiments, the number of chirps in a frame is 64. Some embodiments may include more than 64 chirps per frame, such as 96 chirps, 528 chirps, 256 chirps, or more, or less than 64 chirps per frame, such as 32 chirps or less.

In some embodiments, frames are repeated every FT time. In some embodiments, FT time is 50 ms. A different FT time may also be used, such as more than 50 ms, such as 60 ms, 500 ms, 200 ms, or more, or less than 50 ms, such as 45 ms, 40 ms, or less. In some embodiments, the FT time is selected such that the time between the beginning of the last chirp of frame n and the beginning of the first chirp of frame n+5 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, 0.5 ms, or less, or more than 5 ms, such as 6 ms, or more.

The duration of the chirp (from start to finish) is generally referred to as chirp time ($C_T$). In some embodiments, the chirp time may be, e.g., 64 μs. Higher chirp times, such as 528 μs, or higher, may also be used. Lower chirp times, may also be used.

In some embodiments, the chirp bandwidth may be, e.g., 4 GHz. Higher bandwidths, such as 6 GHz or higher, or lower bandwidths, such as 2 GHz, 5 GHz, or lower, may also be possible.

In some embodiments, the sampling frequency of millimeter-wave radar sensor 502 may be, e.g., 5 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 528 samples, or higher, or a lower number of samples, such as 32 samples or lower, may also be used.

It should be appreciated that the embodiment implementation of millimeter wave radar system 502 described in FIGS. 5A and 5B is just one example of many possible radar systems that could be used in embodiment implementations. For example, in alternative embodiments, a pulse radar system could be used.

Figure 6:
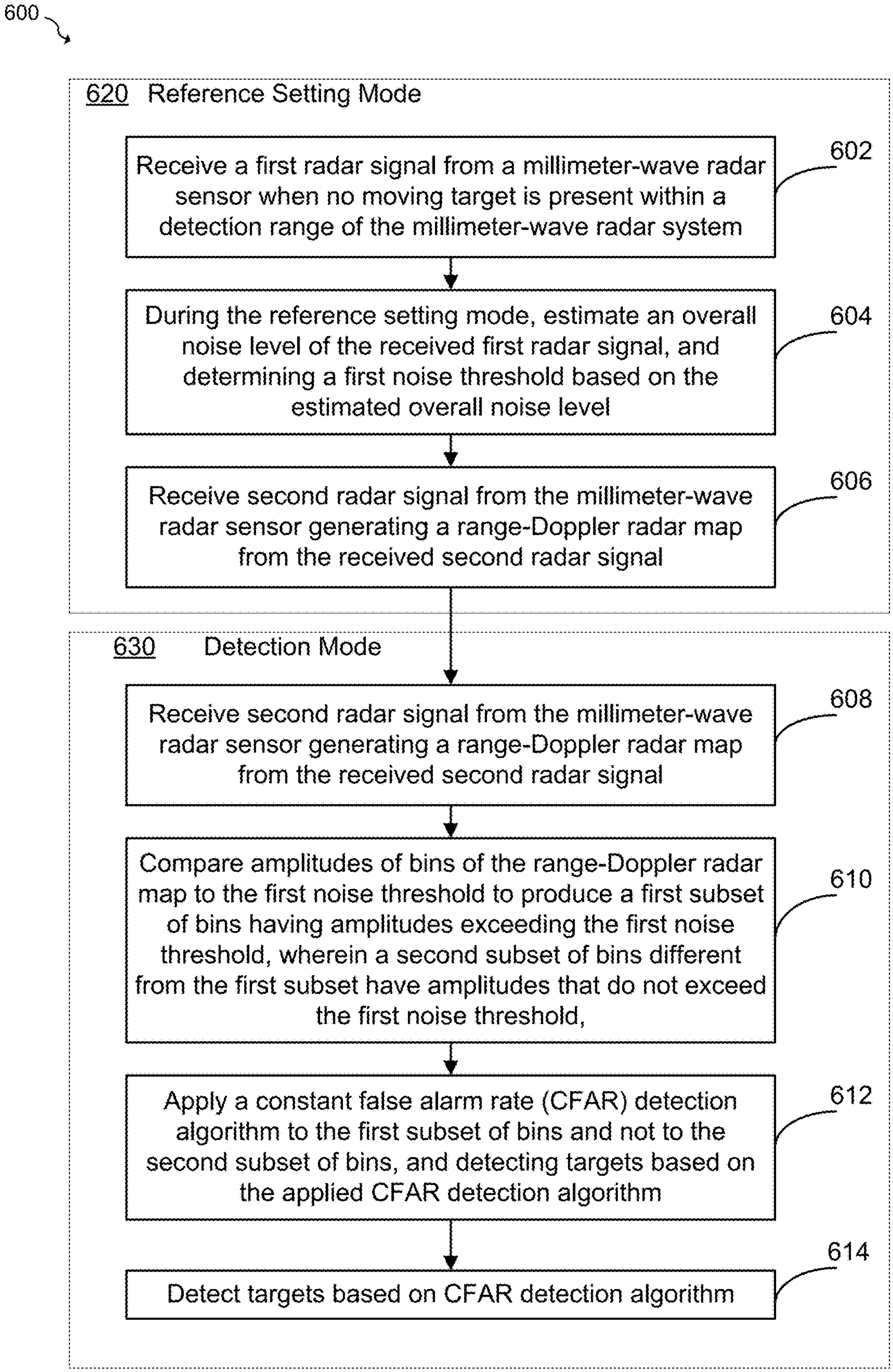
FIG. 6 illustrates a block diagram of an embodiment method.

FIG. 6 illustrates a flowchart of an example method 600. In some implementations, one or more steps of method 600 may be performed by processing system 104.

As shown, method 600 includes a reference setting mode 620 and a detection mode 630. In various embodiments, the reference setting mode is used to determine reference noise level (N) that is used to determine noise threshold $C_T$. In some embodiments, the reference setting mode may be triggered in response to motion sensor 122 determining that no motion is present in target region 204.

Reference setting mode 620 may include receiving a first radar signal from a millimeter-wave radar sensor when no moving target is present within a detection range of the millimeter-wave radar system (step 602), estimating an overall noise level of the received first radar signal (step 604), and determining a first noise threshold based on the estimated overall noise level (block 606). For example, processing system 104 may receive a first radar signal from a millimeter-wave radar sensor when no moving target is present within a detection range of the millimeter-wave radar system, estimate an overall noise level of the received first radar signal using reference noise estimation block 110, and determine a first noise threshold based on the estimated overall noise level, as described above.

Detection mode 630, which may be a normal operation mode in which radar system 100 performs target detection may include receiving a second radar signal from the millimeter-wave radar sensor (step 608), generating a range-Doppler radar map from the received second radar signal, comparing amplitudes of bins of the range-Doppler radar map to the first noise threshold to produce a first subset of bins having amplitudes exceeding the first noise threshold, where a second subset of bins are different from the first subset have amplitudes that do not exceed the first noise threshold (step 610), applying a constant false alarm rate (CFAR) detection algorithm to the first subset of bins and not to the second subset of bins (step 612), and detecting targets based on the applied CFAR detection algorithm (block 614). For example, processing system 104 may receive a second radar signal from the millimeter-wave radar sensor 102, generate a range-doppler radar map from the received second radar signal via preprocessing block 106, compare amplitudes of bins of the range-Doppler radar map to the first noise threshold to produce a first subset of bins having amplitudes exceeding the first noise threshold, where a second subset of bins different from the first subset have amplitudes that do not exceed the first noise threshold via block 112, apply a constant false alarm rate (CFAR) detection algorithm to the first subset of bins and not to the second subset of bins via CFAR threshold estimation block 116, and detect targets based on the applied CFAR detection algorithm, as described above.

Although FIG. 6 shows example blocks of method 600, in some implementations, method 600 may include additional blocks, fewer blocks, different blocks, or differently arranged blocks than those depicted in FIG. 6. Additionally, or alternatively, two or more of the blocks of method 600 may be performed in parallel.

Figure 7:
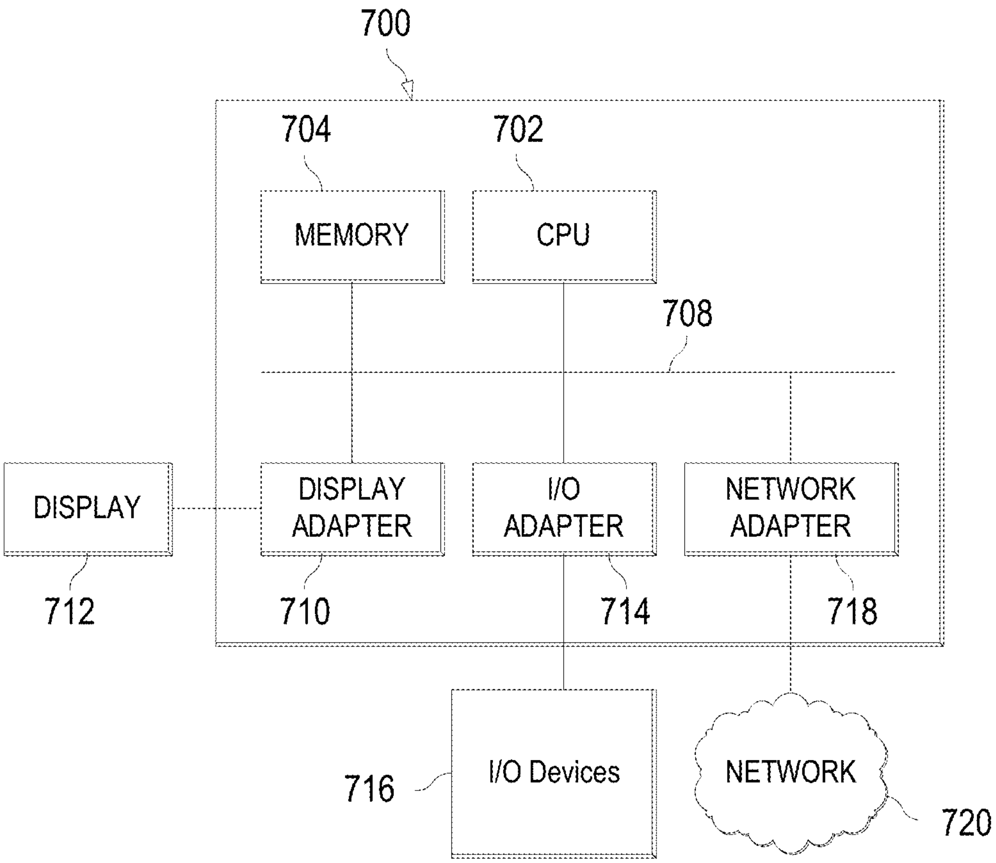
FIG. 7 illustrates a processing system that can be used to implement embodiment algorithms and processing steps.

Referring now to FIG. 7, a block diagram of a processing system 700 is provided in accordance with an embodiment of the present invention. The processing system 700 depicts a general-purpose platform and the general components and functionality that may be used to implement portions of embodiments described herein such as processing system 104.

Processing system 700 may include, for example, a central processing unit (CPU) 702, and memory 704 connected to a bus 708, and may be configured to perform the processes discussed above according to program instructions stored in memory 704 or on other non-transitory computer readable media. The processing system 700 may further include, if desired or needed, a display adapter 710 to provide connectivity to a local display 712 and an input-output (I/O) adapter 714 to provide an input/output interface for one or more input/output devices 716, such as a mouse, a keyboard, flash drive or the like.

The processing system 700 may also include a network interface 718, which may be implemented using a network adaptor configured to be coupled to a wired link, such as a network cable, USB interface, or the like, and/or a wireless/cellular link for communications with a network 720. The network interface 718 may also comprise a suitable receiver and transmitter for wireless communications. It should be noted that the processing system 700 may include other components. For example, the processing system 700 may include hardware components, power supplies, cables, a motherboard, removable storage media, cases, and the like if implemented externally. These other components, although not shown, are considered part of the processing system 700. In some embodiments, processing system 700 may be implemented on a single monolithic semiconductor integrated circuit and/or on the same monolithic semiconductor integrated circuit as other disclosed system components.

Embodiments of the present invention are summarized here. Other embodiments can also be understood from the entirety of the specification and the claims filed herein.

Example 1. A method of operating a radar system may include: estimating an overall noise level of a received radar signal; determining a first noise threshold based on the estimated overall noise level; generating a radar map having a plurality of bins from the radar signal; determining a first subset of the plurality of bins having amplitudes that exceed the first noise threshold; determining a constant false alarm rate (CFAR) threshold only for each bin of the first subset of the plurality of bins; and determining that bins of the first subset having amplitudes exceeding the CFAR threshold correspond to one or more detected object.

Example 2. The method of example 1, where estimating the overall noise level of the received radar signal may include: generating a reference radar map when no moving target is present within a detection range of the radar system; and determining an average power of all bins of the reference radar.

Example 3. The method of example 1 or example 2, where the reference radar map is a range-Doppler radar map.

Example 4. The method of any one of examples 1 to 3, where the reference radar map is a portion of a range angle map of a range-Doppler map representing a range angle within the range-Doppler map.

Example 5. The method of example 4, where the range angle is zero degrees.

Example 6. The method of any one of examples 1 to 5, where determining the first noise threshold based on the overall noise level may include adding a predetermined offset to the estimated overall noise level.

Example 7. The method of example 6, where the predetermined offset is between 5 dB and 10 dB.

Example 8. The method of any one of examples 1 to 7, where determining the first subset of the plurality of bins having amplitudes that exceed the first noise threshold may include comparing amplitudes of each of the plurality of bins of the radar map to the first noise threshold.

Example 9. The method of any one of examples 1 to 8, where determining the CFAR threshold for each bin of the first subset of bins may include determining a mean amplitude of a defined set of neighboring bins around each bin of the first subset of bins.

Example 10. The method of any one of examples 1 to 9, further may include receiving the radar signal from a millimeter-wave radar sensor.

Example 11. A method of operating a millimeter-wave radar system may include: during a reference setting mode: receiving a first radar signal from a millimeter-wave radar sensor when no moving target is present within a detection range of the millimeter-wave radar system, estimating an overall noise level of the received first radar signal, and determining a first noise threshold based on the estimated overall noise level; and during a detection mode different from the reference setting mode: receiving a second radar signal from the millimeter-wave radar sensor, generating a range-Doppler radar map from the received second radar signal, comparing amplitudes of bins of the range-Doppler radar map to the first noise threshold to produce a first subset of bins having amplitudes exceeding the first noise threshold, where a second subset of bins different from the first subset have amplitudes that do not exceed the first noise threshold, applying a constant false alarm rate (CFAR) detection algorithm to the first subset of bins and not to the second subset of bins, and detecting targets based on the applied CFAR detection algorithm.

Example 12. The method of example 11, further may include: determining whether a moving target is present within the detection range of the radar system; and activating the reference setting mode in response to a determination that a moving target is not present within the detection range of the radar system.

Example 13. The method of example 12, where determining whether the moving target is present may include monitoring the detection range of the radar system using a first sensor different from the millimeter-wave radar sensor.

Example 14. The method of example 13, where the first sensor may include an optical sensor, an acoustic sensor, or an inertial sensor.

Example 15. A system, may include: a millimeter-wave radar sensor; and a processor coupled to the millimeter-wave radar sensor, the processor configured to: during a reference setting mode, estimate an overall noise level of a first radar signal received from the millimeter-wave radar sensor, and determine a first noise threshold based on the estimated overall noise level, and during a detection mode different from the reference setting mode, generate a range-Doppler radar map from a second radar signal received form the millimeter-wave radar sensor, determine a first subset of bins having amplitudes exceeding the first noise threshold, where a second subset of bins different from the first subset have amplitudes that do not exceed the first noise threshold, apply a constant false alarm rate (CFAR) detection algorithm to the first subset of bins and not to the second subset of bins, and detect targets based on the applied CFAR detection algorithm.

Example 16. The system of example 15, further may include: one or more transmit antennas coupled to the millimeter-wave radar sensor; and one or more receive antennas coupled to the millimeter-wave radar sensor.

Example 17. The system of example 15 or example 16, further may include an optical sensor coupled to the processor and configured to monitor a detection range of the millimeter-wave radar sensor, where the processor is configured to enter the reference setting mode in response to the optical sensor indicating that no motion is present within the detection range of the millimeter-wave radar sensor.

Example 18. The system of any one of examples 15 to 17, where: the processor is configured to estimate the overall noise level of the first radar signal by generating a reference radar map when no moving target is present within a detection range of the millimeter-wave radar sensor, and determining an average power of all bins of the reference radar map; and the processor is configured to determine the first noise threshold by adding a predetermined offset to the estimated overall noise level.

Example 19. The system of any one of examples 15 to 18, where the processor is configured to apply the CFAR detection algorithm to the first subset of bins and not to the second subset of bins by: determining a CFAR threshold only for each bin of the first subset of bins and not to the second subset of bins; and determining that bins of the first subset having amplitudes exceeding the CFAR threshold correspond to detected objects.

Example 20. The system of any one of examples 15 to 19, where the millimeter-wave radar sensor is a frequency-modulated continuous-wave (FMCW) radar sensor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a radar system, the method comprising:

estimating an overall noise level of a received radar signal;

determining a first noise threshold based on the estimated overall noise level;

generating a radar map from the radar signal, the radar map comprising a plurality of bins, each bin of the plurality of bins having a respective amplitude;

determining a first subset of the plurality of bins having respective amplitudes that exceed the first noise threshold;

determining a respective constant false alarm rate (CFAR) threshold only for each bin of the first subset of the plurality of bins; and generating a target detection output at a rate at least equal to a frame rate of the radar system, the target detection output indicating, for each bin of the first subset, whether the respective amplitude of the bin exceeds the respective CFAR threshold of the bin, wherein bins of the first subset for which the respective amplitude exceeds the respective CFAR threshold correspond to one or more detected objects.

2. The method of claim 1, wherein estimating the overall noise level of the received radar signal comprises:

generating a reference radar map when no moving target is present within a detection range of the radar system; and determining an average power of all bins of the reference radar map.

3. The method of claim 2, wherein the reference radar map is a range-Doppler radar map.

4. The method of claim 2, wherein the reference radar map is a portion of a range angle map of a range-Doppler map representing a range angle within the range-Doppler map.

5. The method of claim 4, wherein the range angle is zero degrees.

6. The method of claim 1, wherein determining the first noise threshold based on the overall noise level comprises adding a predetermined offset to the estimated overall noise level.

7. The method of claim 6, wherein the predetermined offset is between 5 dB and 10 dB.

8. The method of claim 1, wherein determining the first subset of the plurality of bins having amplitudes that exceed the first noise threshold comprises comparing amplitudes of each of the plurality of bins of the radar map to the first noise threshold.

9. The method of claim 1, wherein determining the CFAR threshold for each bin of the first subset of bins comprises determining a mean amplitude of a defined set of neighboring bins around each bin of the first subset of bins.

10. The method of claim 1, further comprising receiving the radar signal from a millimeter-wave radar sensor.

11. A radar system, comprising:

a millimeter-wave radar sensor; and a processor coupled to the millimeter-wave radar sensor, the processor configured to:

estimate an overall noise level of a received radar signal;

determine a first noise threshold based on the estimated overall noise level;

generate a radar map from the radar signal, the radar map comprising a plurality of bins, each bin of the plurality of bins having a respective amplitude;

determine a first subset of the plurality of bins having amplitudes that exceed the first noise threshold;

determine a respective constant false alarm rate (CFAR) threshold only for each bin of the first subset of the plurality of bins; and generate a target detection output at a rate at least equal to a frame rate of the radar system, the target detection output indicating, for each bin of the first subset, whether the respective amplitude of the bin exceeds the respective CFAR threshold of the bin, wherein bins of the first subset for which the respective amplitude exceeds the respective CFAR threshold correspond to one or more detected objects.

12. The radar system of claim 11, further comprising:

one or more transmit antennas coupled to the millimeter-wave radar sensor; and one or more receive antennas coupled to the millimeter-wave radar sensor.

13. The radar system of claim 11, further comprising an optical sensor coupled to the processor and configured to monitor a detection range of the millimeter-wave radar sensor.

14. The radar system of claim 11, wherein the overall noise level of the received radar signal is estimated by:

generating a reference radar map when no moving target is present within a detection range of the radar system; and determining an average power of all bins of the reference radar map.

15. The radar system of claim 14, wherein the reference radar map is a range-Doppler radar map.

16. The radar system of claim 14, wherein the reference radar map is a portion of a range angle map of a range-Doppler map representing a range angle within the range-Doppler map.

17. The radar system of claim 11, wherein the first noise threshold is determined based on the overall noise level by adding a predetermined offset to the estimated overall noise level.

18. A radar system, comprising:

a millimeter-wave radar sensor;

at least one processor; and a memory with instructions stored thereon, wherein the instructions, when executed by the at least one processor enable the system to:

estimate an overall noise level of a received radar signal;

determine a first noise threshold based on the estimated overall noise level;

generate a radar map from the radar signal, the radar map comprising a plurality of bins, each bin of the plurality of bins having a respective amplitude;

determine a first subset of the plurality of bins having amplitudes that exceed the first noise threshold;

determine a respective constant false alarm rate (CFAR) threshold only for each bin of the first subset of the plurality of bins; and generate a target detection output at a rate at least equal to a frame rate of the radar system, the target detection output indicating, for each bin of the first subset, whether the respective amplitude of the bin exceeds the respective CFAR threshold of the bin, wherein bins of the first subset for which the respective amplitude exceeds the respective CFAR threshold correspond to one or more detected objects.

19. The radar system of claim 18, further comprising:

one or more transmit antennas coupled to the millimeter-wave radar sensor; and one or more receive antennas coupled to the millimeter-wave radar sensor.

20. The radar system of claim 18, wherein the overall noise level of the received radar signal is estimated by:

generating a reference radar map when no moving target is present within a detection range of the radar system; and determining an average power of all bins of the reference radar map.

* * * * *